(12) United States Patent
Meyer et al.

(10) Patent No.: US 12,391,175 B2
(45) Date of Patent: *Aug. 19, 2025

(54) SYSTEMS AND METHODS FOR A LIGHTING ASSEMBLY FOR A GOLF CART

(71) Applicant: COLUMBIA VEHICLE GROUP, INC., Reedsburg, WI (US)

(72) Inventors: Kurt A. Meyer, Martinez, GA (US); Joon Wei Cao, Xinyi (CN)

(73) Assignee: COLUMBIA VEHICLE GROUP, INC., Reedsburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/013,771

(22) Filed: Jan. 8, 2025

(65) Prior Publication Data
US 2025/0145083 A1 May 8, 2025

Related U.S. Application Data

(63) Continuation of application No. 18/419,221, filed on Jan. 22, 2024, now Pat. No. 12,311,836.
(Continued)

(51) Int. Cl.
*B60Q 1/50* (2006.01)
*B60Q 1/26* (2006.01)
(Continued)

(52) U.S. Cl.
CPC ........... *B60Q 1/543* (2022.05); *B60Q 1/2619* (2013.01); *B60Q 1/32* (2013.01); *F21S 43/237* (2018.01); *B60Q 2400/20* (2013.01)

(58) Field of Classification Search
CPC ................ A63B 55/60; A63B 2102/32; A63B 2055/601–605; B60Q 1/2619;
(Continued)

(56) References Cited

U.S. PATENT DOCUMENTS

| 4,838,567 A | 6/1989 | Michanczyk |
| 6,709,137 B1 | 3/2004 | Glovak et al. |

(Continued)

OTHER PUBLICATIONS

Golf Cart Resource, 2024 Tomberlin™ Engage LX, Retrieved from https://golfcartresource.com/golf-carts-for-sale/listing/2024-tomberlin-engage-lx/, Version Accessed on Aug. 21, 2024, 7 pages.
(Continued)

*Primary Examiner* — Jason M Han
(74) *Attorney, Agent, or Firm* — QUARLES & BRADY LLP (57) ABSTRACT

In accordance with some aspects of the present disclosure, a lighting system for a golf cart includes a rocker panel secured to a side panel of the golf cart and including a pipe aperture disposed therein. The lighting system further includes a light pipe secured within the pipe aperture of the rocker panel, a light source housed within the light pipe, and a processor connected to the lighting system and configured to provide lighting instructions thereto. The light pipe directs light emitted from the light source outward from the side panel of the golf cart. The lighting instructions are configured for at least one of providing a first lighting sequence by the light source when an ignition of the golf cart is activated, and switching to and maintaining a second lighting sequence by the light source when a drivetrain of the golf cart is turned on.

21 Claims, 8 Drawing Sheets

Related U.S. Application Data (60) Provisional application No. 63/440,654, filed on Jan. 23, 2023.

(51) Int. Cl.
*B60Q 1/32* (2006.01)
*F21S 43/237* (2018.01)

(58) Field of Classification Search
CPC .............. B60Q 1/32; B60Q 1/50–549; B60Q 2400/20; F21S 43/235–241; F21V 23/04; F21W 2103/00; F21W 2107/10
See application file for complete search history.

(56) References Cited

U.S. PATENT DOCUMENTS

| | | |
|---|---|---|
| 9,366,404 B1 | 6/2016 | Porter et al. |
| 9,539,937 B2 | 1/2017 | Dellock et al. |
| 10,576,879 B1 | 3/2020 | Salter et al. |
| 11,009,207 B2 | 5/2021 | Olmr |
| 11,027,672 B1 | 6/2021 | Shaffer et al. |
| D997,779 S | 9/2023 | Xu et al. |
| D1,009,693 S | 1/2024 | Lyons et al. |
| D1,013,575 S | 2/2024 | Nolte et al. |
| D1,015,938 S | 2/2024 | Xu et al. |
| D1,015,939 S | 2/2024 | Xu et al. |
| D1,015,940 S | 2/2024 | Xu et al. |
| D1,023,830 S | 4/2024 | Kaneko et al. |
| D1,027,723 S | 5/2024 | Luo |
| D1,031,515 S | 6/2024 | Luo |
| D1,034,309 S | 7/2024 | Burke |
| D1,036,300 S | 7/2024 | Dong |
| 2020/0375006 A1 | 11/2020 | Erickson et al. |
| 2022/0371516 A1 | 11/2022 | Ye et al. |
| 2022/0379800 A1 | 12/2022 | Walasik |
| 2024/0246480 A1 | 7/2024 | Meyer et al. |
| 2024/0246613 A1 | 7/2024 | Zaremba et al. |

OTHER PUBLICATIONS

Tomberlin, Engage LX, Retrieved from https://www.tomberlinusa.com/vehicles/engage/lx, Version Accessed on Aug. 21, 2024, 14 pages.

SYSTEMS AND METHODS FOR A LIGHTING ASSEMBLY FOR A GOLF CART

CROSS REFERENCE TO RELATED APPLICATIONS

This application is a continuation of U.S. application Ser. No. 18/419,221, filed on Jan. 22, 2024, which claims the benefit of U.S. Provisional Application No. 63/440,654, filed on Jan. 23, 2023, each of which is incorporated by reference herein in its entirety.

STATEMENT REGARDING FEDERALLY SPONSORED RESEARCH

N/A

BACKGROUND

1. Field of the Disclosure

The present disclosure relates generally to golf cart lighting systems and methods. More specifically, the present disclosure relates to systems and methods for providing golf cart safety lighting, for example, that can provide an indication that the golf cart is turned on.

2. Description of the Background of the Disclosure

Motor vehicles typically include rocker panels that offer a variety of utility and aesthetic benefits. There exists a need for rocker panels with light illumination on a golf cart in order to provide enhanced safety and visibility improvements.

SUMMARY

The present disclosure overcomes the aforementioned drawbacks by providing systems and methods for creating providing enhanced safety features for a golf cart by enhancing visibility characteristics of the golf cart and providing illuminated signals when the golf cart is in an active state.

In accordance with some aspects of the present disclosure, a lighting system for a golf cart includes a rocker panel secured to a side panel of the golf cart and including a pipe aperture disposed therein. The lighting system further includes a light pipe secured within the pipe aperture of the rocker panel, a light source housed within the light pipe, and a processor connected to the lighting system and configured to provide lighting instructions thereto. The light pipe directs light emitted from the light source in an outward direction from the side panel of the golf cart. The lighting instructions are configured for at least one of providing a first lighting sequence by the light source when an ignition of the golf cart is activated, and switching to and maintaining a second lighting sequence by the light source when a drivetrain of the golf cart is turned on.

In accordance with some aspects of the present disclosure, a lighting system for a golf cart includes a rocker panel secured to a side panel of the golf cart that includes a pipe aperture disposed therein, a first end, a second end, a lateral axis defined between the first end and the second end, and a panel aperture. The lighting system further includes a light pipe secured in the pipe aperture of the rocker panel and a processor connected to the lighting system and configured to provide lighting instructions thereto. The light pipe includes a straight segment and a "U" shaped segment, the straight segment extends in line with the panel aperture in a direction parallel to the lateral axis, and the "U" shaped segment outlines the panel aperture.

In accordance with some aspects of the present disclosure, a method of illuminating an exterior area of a golf cart includes the steps of receiving, by a processor, an ignition signal that an ignition of the golf cart has been activated, the ignition of the golf cart activating a drivetrain of the golf cart, and instructing, by the processor, a light assembly to display a first lighting sequence. The method further includes the steps of switching from the first lighting sequence to a second lighting sequence, receiving, by the processor, a termination signal that the drivetrain of the golf cart has been deactivated, and deactivating, by the processor, the light assembly.

In accordance with some aspects of the present disclosure, a golf cart includes a rocker panel defining a first end, a second end opposite the first end, and a lateral axis that extends between the first end and the second end. The rocker panel includes a notch and a panel aperture disposed along the lateral axis, the panel aperture defining a first panel end that is located closer to the first end of the rocker panel and a second panel end that is located closer to the second end of the rocker panel. The rocker panel further includes a pipe aperture that extends along the lateral axis, the pipe aperture including a first aperture segment extending from the first end of the rocker panel to the notch, a second aperture segment extending from the notch to the first panel end of the panel aperture, and a third aperture segment extending from the second panel end of the panel aperture to the second end of the rocker panel. A panel is secured within the panel aperture and includes a logo applied thereto, and a light pipe is secured within the pipe aperture. The light pipe includes a first pipe segment secured within the first aperture segment, a second pipe segment secured within the second aperture segment, and a third pipe segment secured within the third aperture segment. A light source is disposed within the light pipe, and the light pipe is configured to direct light emitted from the light source outward from the rocker panel of the golf cart.

In accordance with some aspects of the present disclosure, a golf cart includes a frame, a body disposed on the frame and including a side panel, and a rocker panel coupled to the side panel and defining a first end, a second end opposite the first end, and a lateral axis that extends between the first end and the second end. The rocker panel includes a panel aperture disposed along the lateral axis and defining a first panel end that is located closer to the first end of the rocker panel and a second panel end that is located closer to the second end of the rocker panel. The rocker panel further includes a pipe aperture that extends along the lateral axis, the pipe aperture including a first segment that is parallel with respect to the lateral axis and extends between the first end of the rocker panel and the first panel end of the panel aperture, and a second segment is parallel with respect to the lateral axis and extends between the second panel end of the panel aperture and the second end of the rocker panel. A light pipe is secured within the pipe aperture of the rocker panel, and a light source is housed within the light pipe. The light source is configured to emit a multi-color lighting sequence when a switch on the golf cart is activated, and the light pipe is configured to direct light emitted from the light source outward from the rocker panel of the golf cart.

In accordance with some aspects of the present disclosure, a method of illuminating an exterior region of a golf cart includes receiving, by a processor, a first activation signal that a first switch of the golf cart has been activated, and instructing, by the processor, a light source housed within a light pipe to display a first lighting sequence. The light pipe is secured within a pipe aperture defined by a rocker panel of the golf cart. The method further includes receiving, by the processor, a second activation signal that a second switch of the golf cart has been activated, and instructing, by the processor, the light source to switch from the first lighting sequence to a second lighting sequence.

The foregoing and other advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

The term "about," as used herein, refers to variations in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

Figure 1:
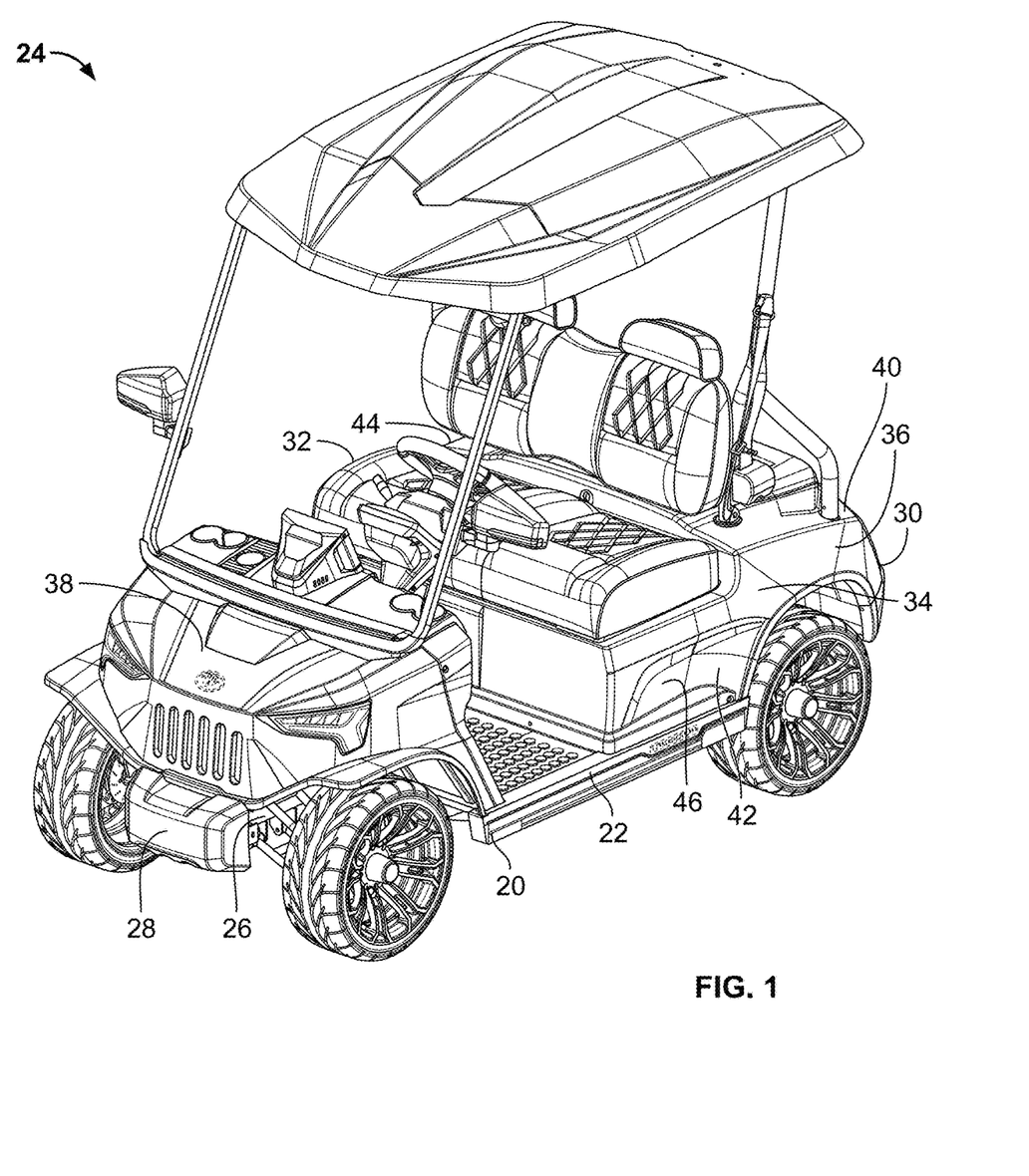
FIG. 1 is an isometric view of a golf cart including a rocker panel according to some aspects of the present disclosure.

The terms "upper", "lower", "right", "left", "rear", "front", "vertical", "horizontal", "interior", "exterior," and derivatives thereof shall relate to the device as oriented in FIG. 1. However, it is to be understood that the device may assume various alternative orientations, except where expressly specified to the contrary. It is also to be understood that the specific devices and processes described herein are simply exemplary embodiments of the inventive concepts defined in the appended claims. Therefore, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
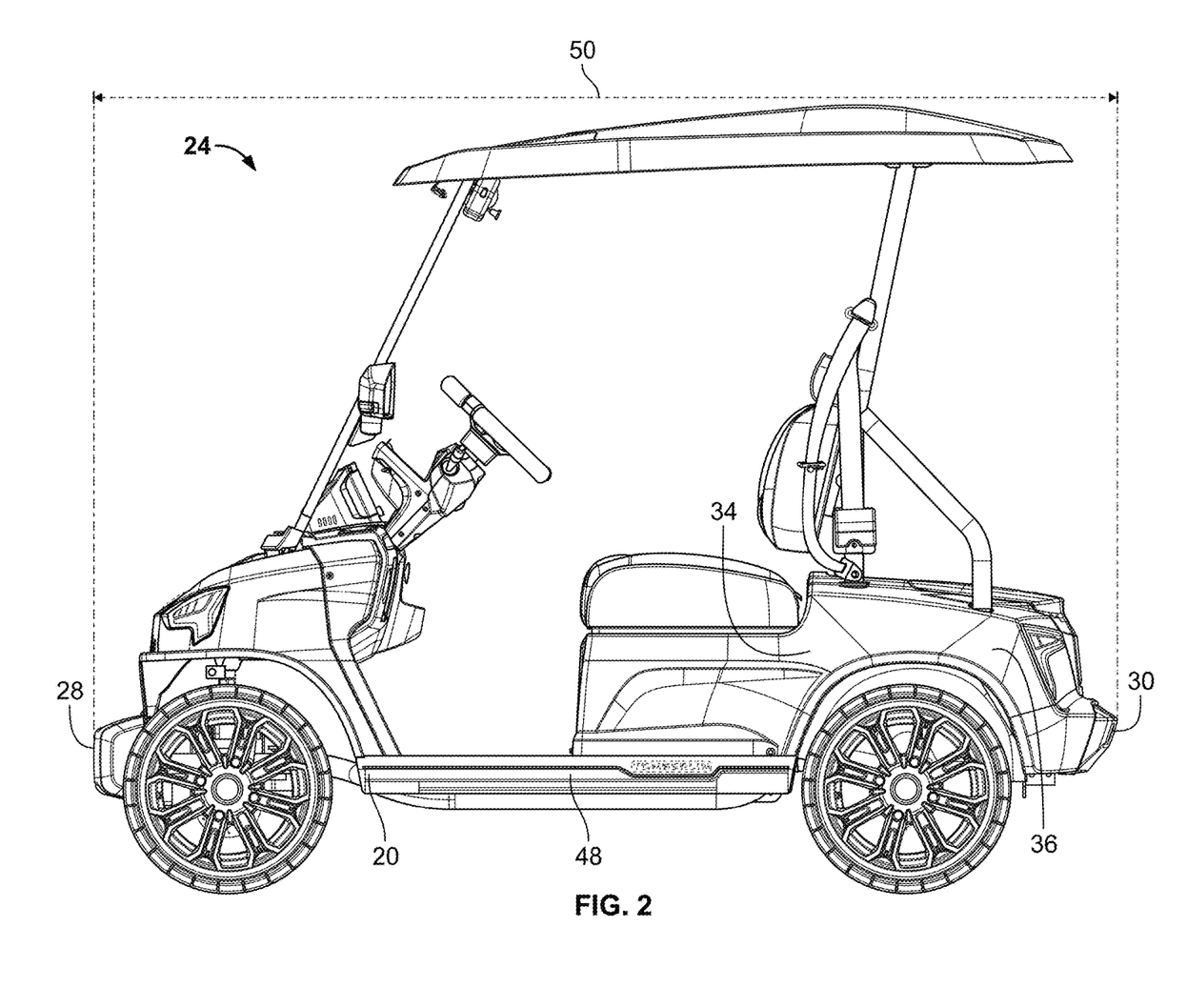
FIG. 2 is a left-side elevational view of the golf cart of FIG. 1.
Figure 3:
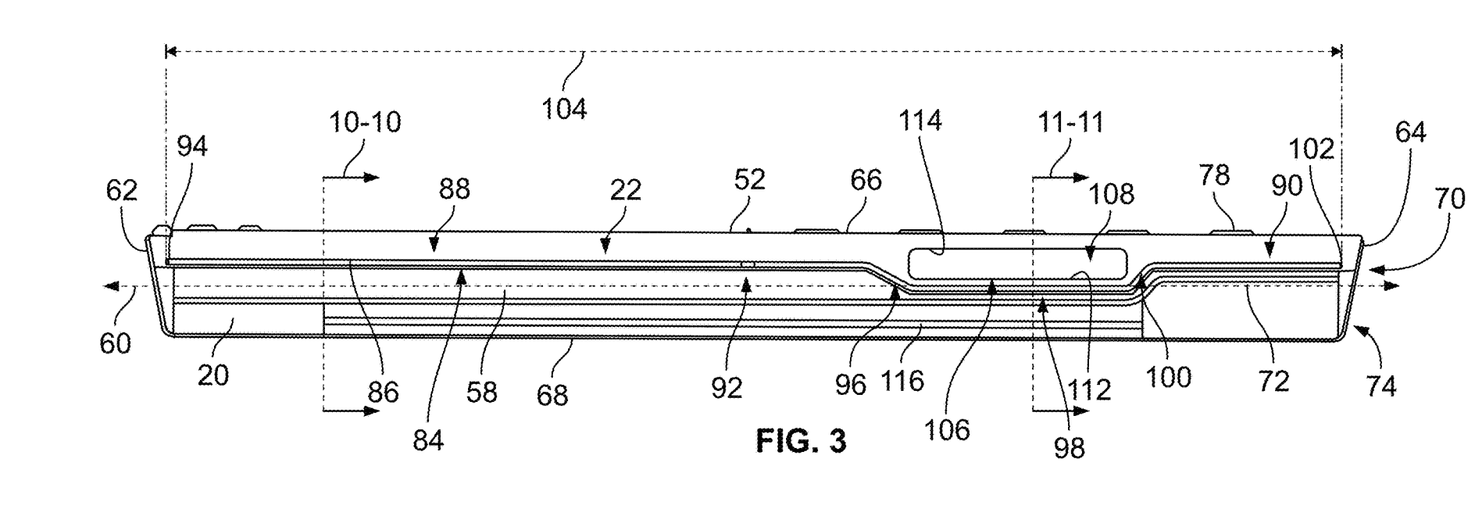
FIG. 3 is a left-side elevational view of a rocker panel with a lighting assembly of the golf cart of FIG. 1 according to some aspects of the present disclosure.

Referring now to FIGS. 1-3, a rocker panel 20 is illustrated with a lighting assembly 22 for a golf cart 24 according to the present disclosure. The golf cart 24 includes at least a frame 26, an ignition (not shown), a drivetrain (not shown), and an electrical system (not shown), and the golf cart 24 defines a front end 28, back end 30, right side 32, and a left side 34 thereof. An exterior body 36 is disposed on the frame 26 of the golf cart 24, and the exterior body 36 includes at least a front cover 38, a rear cover 40, and a side panel 42 such as a right-side cover 44 and/or a left-side cover 46. In some aspects, the exterior body 36 is a unitary construction, i.e., two or more of the front cover 38, rear cover 40, right-side cover 44, and left side 34 cover are formed integrally with one another, or two or more of the front cover 38, rear cover 40, right-side cover 44, and left side 34 cover are secured to one another using fasteners (not shown) or connecting tabs. In some aspects, the exterior body 36 of the golf cart 24 comprises sheet steel, fiberglass, sheet aluminum, or plastic.

Referring now to FIG. 2, a left-side view of the rocker panel 20 with the lighting assembly 22 (see FIG. 1) is shown. While only a left-side rocker panel 48 is discussed, it will be understood that aspects of the rocker panel 20 and lighting assembly 22 as discussed herein are applicable to both a right-side rocker panel and a left-side rocker panel 48, and a right-side rocker panel is a mirror image of the left-side rocker panel 48 and similarly includes a mirror image lighting assembly. The left-side rocker panel 48 will hereinafter be generally referred to as the rocker panel 20. The rocker panel 20 is coupled to one or more elements of the exterior body 36 along the left side 34 of the golf cart 24 and extends along an entire length 50 of the golf cart 24 defined along a widest dimension of the golf cart 24 between the front end 28 of the golf cart 24 and the back end 30 of the golf cart 24. In some aspects, the rocker panel 20 extends between 0%-100%, 75%-100%, 50%-75%, 25%-100%, 25-50%, 35-50%, or 40-50% of the entire length 50 of the golf cart 24. By extending along a length of the golf cart 24, the rocker panel 20 provides increased structural reinforcement to the golf cart 24 as well as providing an aesthetic appeal to an operator. Occupants, passengers, and operators may generally be referred to as operators of the vehicle for clarity hereinafter. In some aspects, the rocker panel 20 is formed integrally with the exterior body 36 of the golf cart 24, and the rocker panel 20 comprises sheet steel, fiberglass, sheet aluminum, or plastic.

Figure 4:
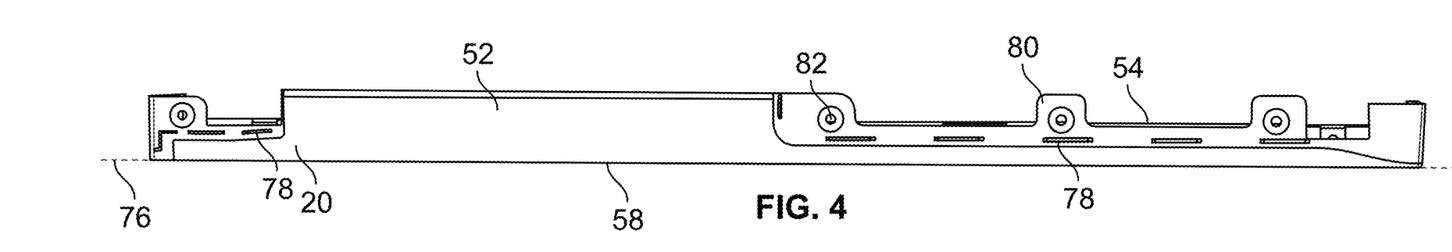
FIG. 4 is a top elevational view of the rocker panel of FIG. 3.
Figure 5:
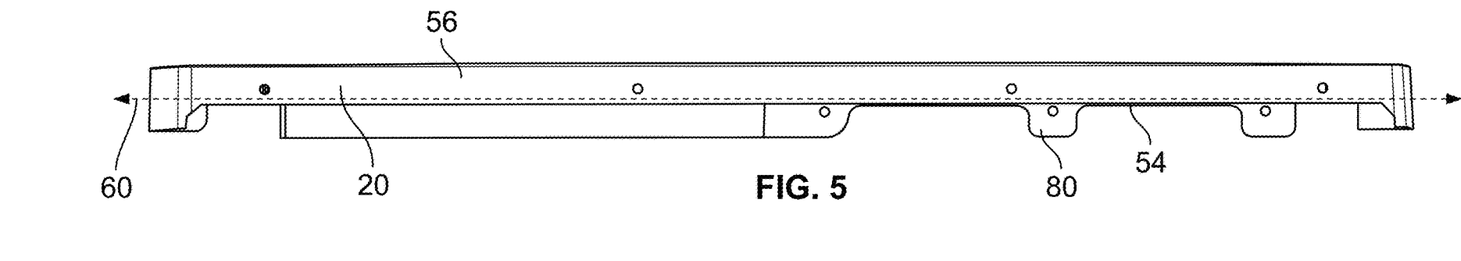
FIG. 5 is a bottom elevational view of the rocker panel of FIG. 3.

Referring now to FIGS. 3-5, a side view is illustrated of the rocker panel 20 with the lighting assembly 22. The rocker panel 20 includes a top face 52, a right face 54, a bottom face 56, a left face 58, and a lateral axis 60 that extends between a first panel end 62 and a second panel end 64 of the rocker panel 20 parallel to the top face 52 and the bottom face 56. The left face 58 is substantially trapezoidal in shape and defines a top edge 66 and a bottom edge 68, although it is contemplated that a variety of shapes or geometries can be used to form the left face 58. An upper region 70 of the rocker panel 20 is defined between the top edge 66 and a midplane 72 of the rocker panel 20 that exists along the lateral axis 60, and a lower region 74 of the rocker panel 20 is adjacent to the upper region 70 and extends from the bottom edge 68 to the midplane 72. The left face 58 further defines an exterior plane 76 of the rocker panel 20 (see FIG. 4). A plurality of mounting tabs 78 extends in an upward direction from the top face 52 and downward from the bottom face 56, and is configured to secure the rocker panel 20 to an element of the exterior body 36, e.g., the front cover 38, the rear cover 40, or the side cover (44, 46). The rocker panel 20 also includes mounting brackets 80 having eyelets 82 that extend from the top face 52 and the bottom face 56, and the eyelets 82 are configured to receive fasteners (not shown) therethrough, e.g., screws, bolts, or another type of fastener, for the purpose of further securing the rocker panel 20 to the exterior body 36. In this way, the rocker panel 20 is retained on the frame 26, directly or indirectly, in order to strengthen the construction and assembly of the golf cart 24.

Referring now to FIG. 3, the rocker panel 20 is illustrated with the lighting assembly 22 housed therein. The left face 58 of the rocker panel 20 includes a pipe aperture 84 that is configured to receive a light pipe 86 therein. The pipe aperture 84 is spaced from the top edge 66 and the bottom edge 68 of the left face 58 and is disposed within the left face 58. Additionally, the pipe aperture 84 includes a first segment 88 that is substantially straight and that is separated from a substantially curved or "U" shaped second segment 90 by a notch 92. In some aspects, the notch 92 is not included in the rocker panel 20 such that the pipe aperture 84 is continuous along its length. In some aspects, the pipe aperture 84 begins at a front panel end 94, first extending in a direction that is parallel to the lateral axis 60 to define the first segment 88, and then extending in a downward diagonal direction with respect to the left face 58 to define a first leg 96 of the second segment 90. The pipe aperture 84 then extends in a direction that is parallel to the lateral axis 60 to define a base 98 of the second segment 90, and the pipe aperture 84 then extends in an upward diagonal direction with respect to the left face 58 to define a second leg 100 of the second segment 90. The pipe aperture 84 further extends in a direction that is parallel to the lateral axis 60 and ends at a back panel end 102. In some aspects, a length 104 of the pipe aperture 84, i.e., a length of the first segment 88 combined with a length of the second segment 90 or the continuous length 104 of the pipe aperture 84, is between 0.50 m and 3.00 m, between 0.50 m and 2.00 m, between 0.50 m and 1.00 m, between 1.00 m and 2.00 m, or between 1.50 m and 2.50 m.

In some aspects, the rocker panel 20 further includes a rectangular aperture 106 that extends through the left face 58 and the right face 54 to define a panel aperture 108. The panel aperture 108 is configured to receive a rectangular panel 110 including specific texts, images, or symbols desirable to a passenger, e.g., a logo, a name, a golf cart identification number, or another identifier. The panel aperture 108 is disposed between the top edge 66 and the pipe aperture 84 and is spaced from both the top edge 66 and the pipe aperture 84. Specifically, the panel aperture 108 is disposed above the second segment 90 of the pipe aperture 84 such that second segment curves around a bottom end 112 of the panel aperture 108. In other words, the pipe aperture 84 first extends from the front panel end 94 in line with the panel aperture 108 in a direction that is parallel to the lateral axis 60 to define the first segment 88 and then curves diagonally downward to define the first leg 96 of the second segment 90. The pipe aperture 84 then extends under the panel aperture 108 in a direction that is parallel to the lateral axis 60 to define the base 98 of the second segment 90. The pipe aperture then curves in a diagonally upward direction with respect to the lateral axis 60 to define the second leg 100 of the second segment 90 and further extends in line with the panel aperture 108 to the back panel end 102 in a direction that is parallel to the lateral axis 60. In some aspects, the second segment 90 of the pipe aperture 84 alternatively curves around the panel aperture 108 in a different way, such as around a top end 114 of the panel aperture 108 or around the entire panel aperture 108. In this way, the second segment 90 of the pipe aperture 84 outlines the panel aperture 108, which provides aesthetic and safety advantages such as those discussed further herein. The left face 58 can further include texturing 116 along a length thereof that is congruent with the geometry of the pipe aperture 84 or the panel aperture 108 in order to provide a unique aesthetic appeal and structural support for the rocker panel 20.

Figure 6:
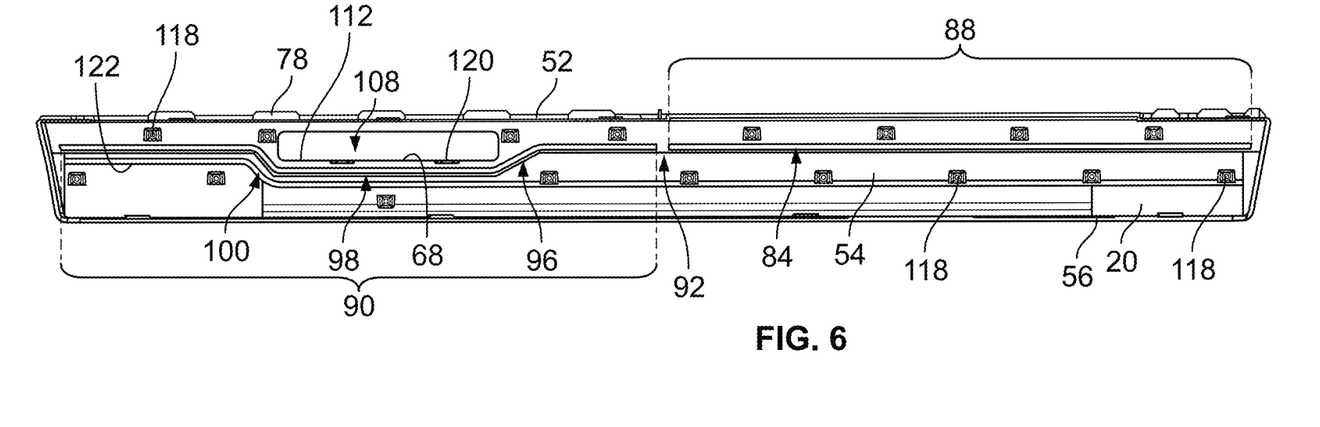
FIG. 6 is a right-side elevational view of the rocker panel of FIG. 3 according to some aspects of the present disclosure.

Referring now to FIG. 6, the right face 54 of the rocker panel 20 is illustrated as discussed for FIGS. 3-5. In addition to the pipe aperture 84 and the panel aperture 108, the right face 54 also includes a plurality of fasteners 118 that are disposed on either side of the pipe aperture 84. The plurality of fasteners 118 are used in conjunction with the plurality of mounting tabs 78 on the top face 52 and the bottom face 56 to secure the rocker panel 20 to the exterior body 36 and retain the rocker panel 20 on the frame 26 of the golf cart 24. In some aspects, the plurality of fasteners 118 is formed integrally with the right face 54 of the rocker panel 20. The rear view in FIG. 6 also illustrates texturing 122 included on the right face 54 that is complementary to the texturing 116 included on the left face 58. The right face 54 further includes retaining tabs 120 along the bottom end 112 of the panel aperture 108 that are configured to retain the rectangular panel 110 including specific texts, images, or symbols.

Figure 7:
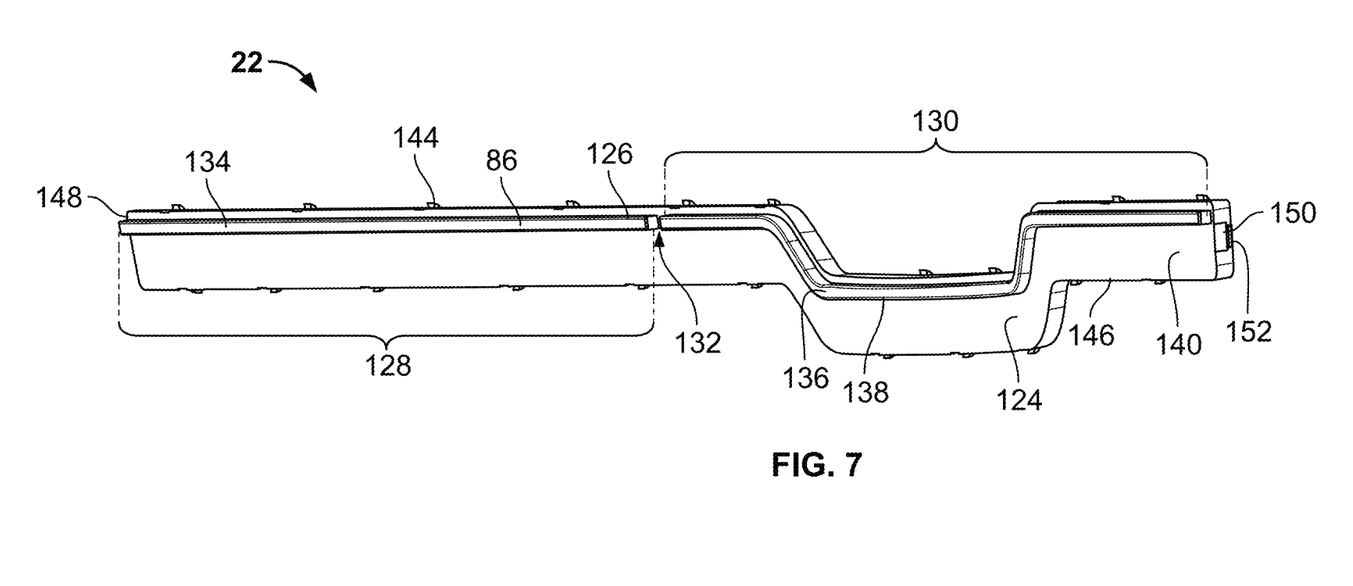
FIG. 7 is an isometric view of a light pipe assembly according to some aspects of the present disclosure.

Referring now to FIG. 7, a perspective view is shown of the lighting assembly 22. The lighting assembly 22 includes the light pipe 86 that is integrally formed with and extends from a lighting base 124. The light pipe 86 has a substantially similar shape as the pipe aperture 84 in the rocker panel 20 such that the light pipe 86 is received within the pipe aperture 84. In some aspects, the light pipe 86 includes substantially planar sides and defines a substantially rectangular pipe body 126, although it is contemplated that a variety of shapes or geometries can be used, e.g., a cylindrical pipe body or a tubular pipe body. Similar to the pipe aperture 84, the light pipe 86 includes a first pipe segment 128 that is substantially straight and that is separated from a substantially curved or "U" shaped second pipe segment 130 by a light pipe gap 132. However, in some aspects, the light pipe 86 does not include the light pipe gap 132 and is instead continuous along its length. The light pipe 86 houses a light source 134 which emits light using electric power drawn from the electrical system of the golf cart 24. In some aspects, the light source 134 is a single incandescent bulb, a system of light emitting diodes (LEDs), a system of halogen bulbs, or another type of fluorescent tube. In some aspects, the light pipe 86 comprises a translucent material, a hard acrylic material, or a soft acrylic material, or the light pipe 86 is translucent only along an exterior face 136 thereof such that light from the light source 134 is directed in a direction outwards from the left face 58 of the rocker panel 20.

Specifically, the light pipe 86 illuminates an illuminated region that is exterior am exterior region of the golf cart 24. In particular, the illuminated region is located in a lateral direction with respect to the side cover of each of the sides of the golf cart 24. In some aspects, the illuminated region extends the entire length 50 of the golf cart 24 and encompasses a region located directly to the side of the rocker panel 20, on the rocker panel 20, and/or the region located by a perimeter around the golf cart 24. Therefore, in some aspects, the illuminated region includes the ground that is located to the side of the rocker panel 20 and in the vicinity of the perimeter of the golf cart 24. In some aspects, the illuminated region does not include the ground that is located to the side of the rocker panel, and the light from the light source 134 is instead directed in an upward, diagonal, and/or lateral direction with respect to the left face 58 of the rocker panel 20. This is particularly advantageous since directing the light in an upward, diagonal, and/or lateral direction with respect to the left face 58 allows the illuminated region to be visible from farther distances away from the golf cart 24. While the illuminated region is discussed as being projected near the left side 34 of the golf cart 24, it will be apparent to those skilled in the art that the light assembly can be implemented on the right side 32 to illuminate a region to the side of a right-side rocker panel. It will be further apparent to those skilled in the art from this disclosure that while the light assembly is illustrated as illuminating the region in the vicinity of the rocker panel 20, the light assembly can illuminate different external regions that are in the vicinity of the golf cart 24 as needed and/or desired.

Figure 8:
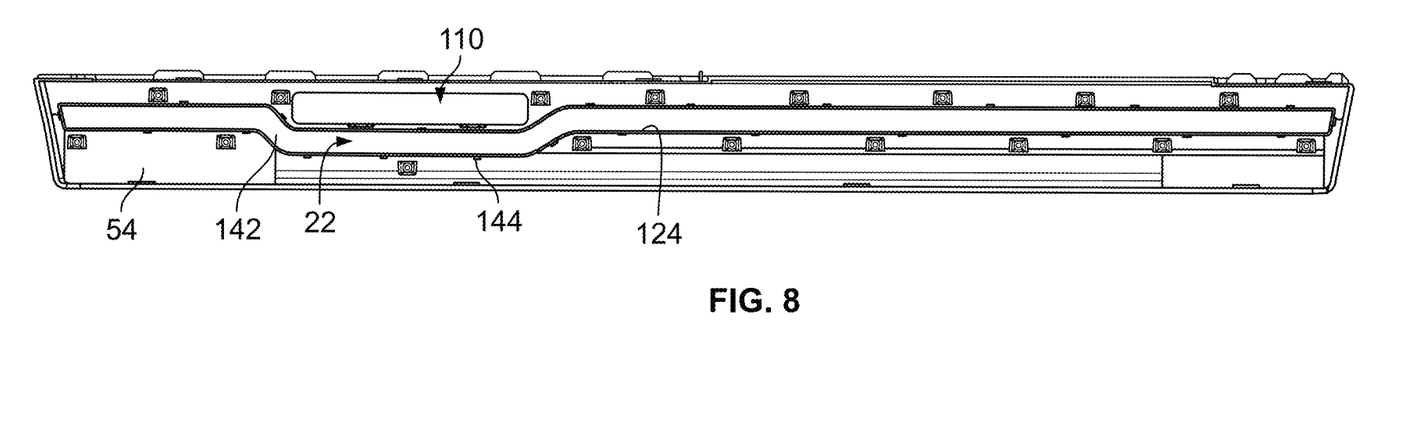
FIG. 8 is a right-side elevational view of a rocker panel with a lighting assembly according to some aspects of the present disclosure.

The lighting base 124 has a similar shape to the light pipe 86, and the lighting base 124 further defines a front base face 140 and a rear base face 142 (see FIG. 8). The light pipe 86 extends from the front base face 140 in an outward of the lighting base 124, and the rear base face 142 of the lighting base 124 includes a plurality of base tabs 144 disposed around a perimeter 146 thereof which are configured to engage with the right face 54 of the rocker panel 20 and secure the lighting assembly 22 to the rocker panel 20. In some aspects, the lighting base 124 is formed integrally with the light pipe 86, or the light pipe 86 is fastened to the lighting basing using an adhesive or another securing means. While the lighting base 124 is integral or independent of the light tube, in some aspects the lighting base 124 comprises a hard acrylic material, a soft acrylic material, sheet steel, fiberglass, sheet aluminum, or plastic. The lighting base 124 further includes a first connection end 148 and a second connection end 150 that are capable of forming structural or electrical connections with external structures, e.g., a processor, a controller, a control panel, a circuit board, or a power source (not shown). In some aspects, the circuit board supports the light source 134 within the light pipe 86. The arrangement of any included lighting elements on the circuit board can be customized depending on the specific application to produce a desired output of light (e.g., an amount of light, a particular dispersion pattern, or a particular lighting sequence). Correspondingly, various aspects of the lighting system can be tuned to provide a desired output, including, for example, the quantity, size, power, and spacing/location of any lighting elements.

In some aspects, the lighting assembly 22 further includes other types of connection structures. That is, the lighting assembly 22 is further configured to provide structural or electrical connections with external structures (e.g., external devices). In some aspects, such connection structures serve as locating or orientating features configured to allow the lighting assembly 22 to couple with another object in a specific way. In some aspects, the lighting base 124 includes one or more access ports 152. Access ports 152 are configured to be opened by a user to access components that may be generally contained within a housing. In some aspects, the access ports 152 are configured as tool-less access ports that can be operated by a user without the need for tools (e.g., a screwdriver), or they can require tools to open (e.g., an access port that is closed with fasteners). Access ports 152 can be provided for specific functions, such as facilitating charging or data transfer, or for storage or access internal components of the lighting assembly 22. In particular, access ports 152 exist at the first connection end 148, the second connection end 150, or both the first connection end 148 and the second connection end 150 of the lighting base 124. In some aspects the access ports 152 are connected to a central vehicle computer (not shown) through a wire or other connection means, and the access ports 152 provide a route for communication between the lighting source and a controller or a processor as will be later discussed herein.

Figure 9:
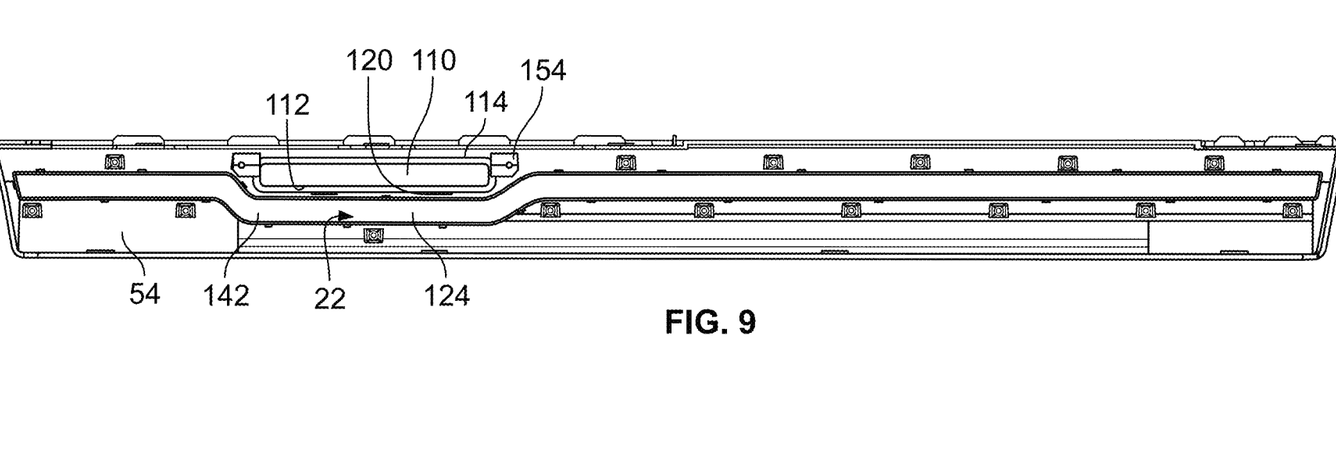
FIG. 9 is a rear elevational view of a rocker panel with a rectangular panel according to some aspects of the present disclosure.

Referring now to FIGS. 8 and 9, the right face 54 of the rocker panel 20 is illustrated with the lighting assembly 22 secured thereto. As previously described the light pipe 86 has a substantially similar shape to the pipe aperture 84 such that the light pipe 86 can only be received into the pipe aperture 84 when the rocker panel 20 and the lighting assembly 22 are oriented congruently with respect to one another. When the light pipe 86 is inserted into the pipe aperture 84, the front base face 140 is placed in contact with the right face 54 of the rocker panel 20, and the plurality of base tabs 144 engage with the right face 54 in order to secure the lighting assembly 22 to the rocker panel 20. In some aspects, the base tabs 144 do not directly engage with the right face 54, and another securing means (e.g., an adhesive, a friction engagement, a separate securing structure, or a fastener) is instead used to retain the light pipe 86 within the pipe aperture 84 and the base 124 on the right face 54 of the rocker panel 20. Referring now to FIG. 9, the rectangular panel 110 is inserted into the panel aperture 108 and includes side tabs 154 that are configured to receive one or more fasteners (not shown) for the purpose of retaining the rectangular panel 110 within the panel aperture 108 in addition to the retaining force provided by the retaining tabs 120.

Figure 10:
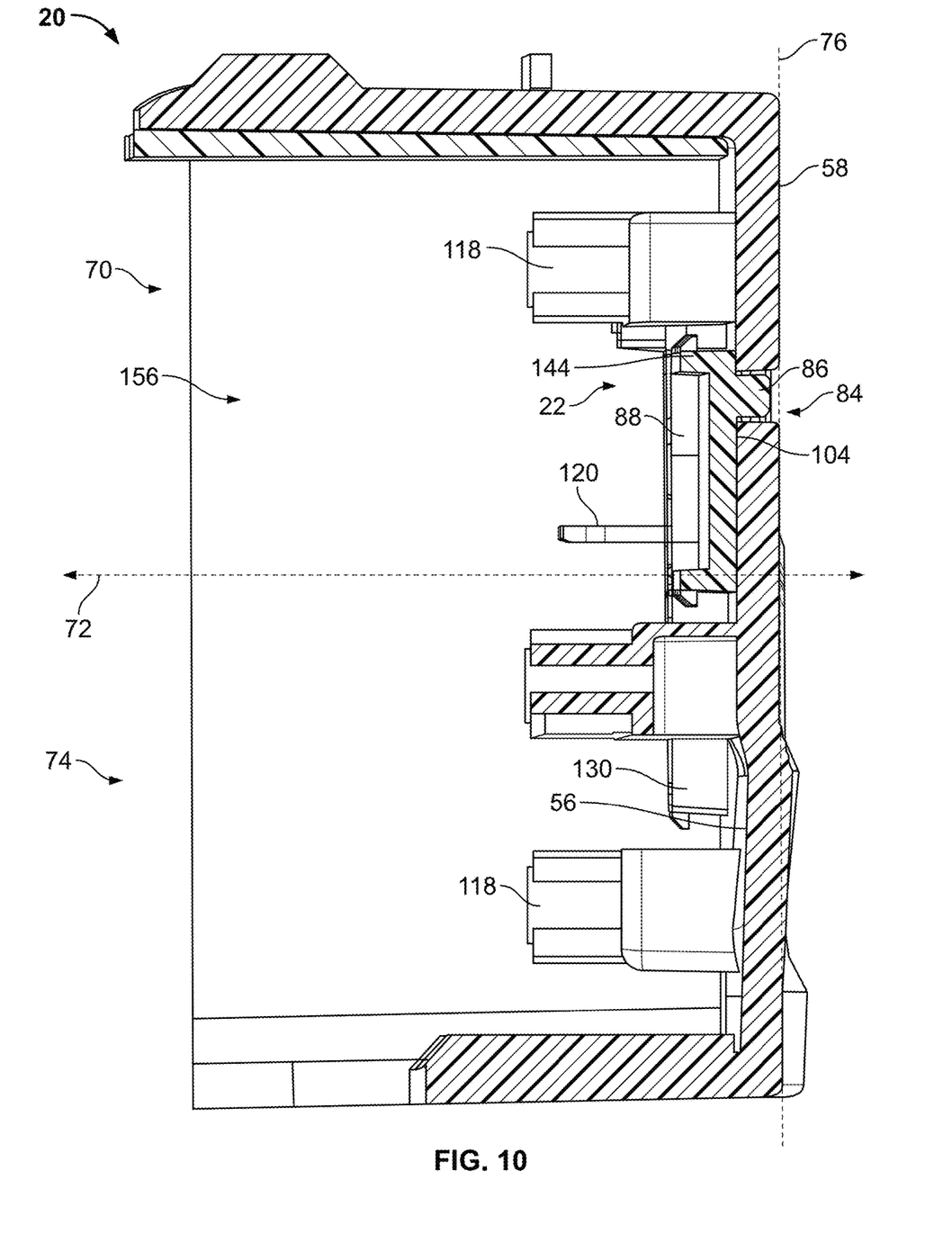
FIG. 10 is a cross section view of the rocker panel with a light pipe assembly taken along line 10-10 of the rocker panel of FIG. 3.

Referring now to FIG. 10, a cross section is illustrated of the rocker panel 20 with the lighting assembly 22 secured thereto taken along line 10-10 of FIG. 3. The lighting assembly 22 is inserted into a rocker panel cavity 156 such that the light pipe 86 is aligned with the pipe aperture 84, and the front base face 140 of the lighting assembly 22 is placed in contact with the right face 54 of the rocker panel 20. In some embodiments, aligning the light pipe 86 with the pipe aperture 84 includes aligning the notch 92 of the pipe aperture 84 with the light pipe gap 132. The light pipe 86 does not extend past the exterior plane 76 of the left face 58, i.e., the light pipe 86 is flush with the left face 58 of the rocker panel 20. In this way, the light pipe 86 is better protected than if it were disposed on the exterior of the golf cart 24, and this can provide a longer life of the light pipe 86 while providing a sleek aesthetic design for the golf cart 24 exterior. Additionally, the retaining tabs 120 are configured to secure the rectangular panel 110 (see FIGS. 6 and 9) and extend away from the rear surface of the rocker panel 20. Still referring to FIG. 10, the first segment 88 of the light pipe 86 is illustrated to extend through the upper region 70, although in some aspects the first segment 88 extends through the lower region 74, or both the upper region 70 and the lower region 74.

Figure 11:
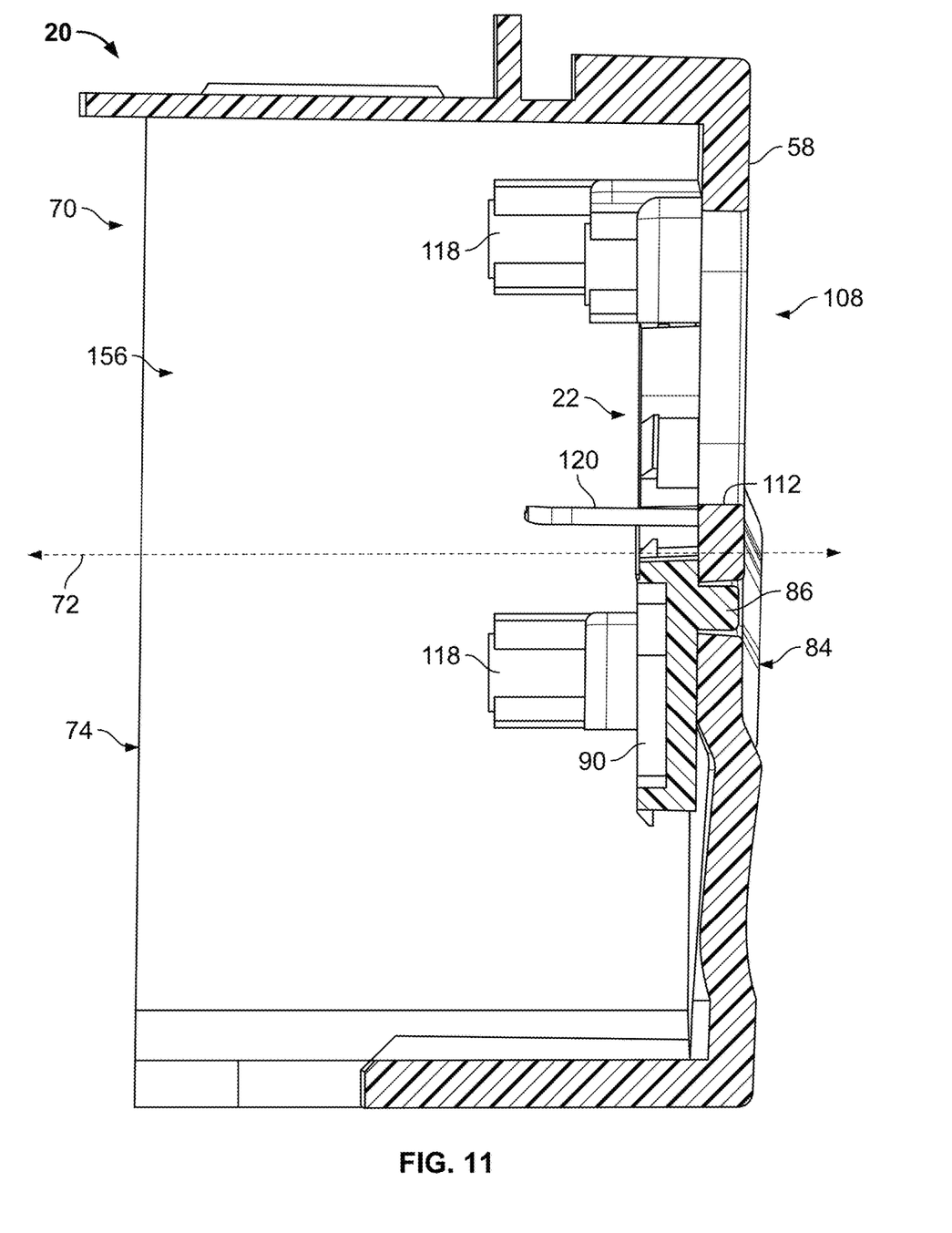
FIG. 11 is a cross section view of the rocker panel with a light pipe assembly taken along line 11-11 of FIG. 3.

Referring now to FIG. 11, a cross section is illustrated of the rocker panel 20 with the lighting assembly 22 secured thereto taken along line 11-11 of FIG. 3. In FIG. 10, the panel aperture 108 is visible, and the second segment 90 of the light pipe 86 curves around the bottom edge 68 of panel aperture 108. This configuration is advantageous since the light pipe 86 provides contoured illumination of the panel aperture 108, thus enhancing visibility of the panel aperture 108 at farther distances from the golf cart 24 while also providing a desirable aesthetic appeal of the left face 58 of the rocker panel 20. Additionally, the second segment 90 of the light pipe 86 extends through the lower region 74 in this view, although in some aspects the second segment 90 extends through the upper region 70 to outline the panel aperture 108. It will become apparent to those skilled in the art that a variety of different geometries and configurations can be used for both the light pipe 86 and the pipe aperture 84 for the purpose of illuminating the sides of the golf cart 24 and in the vicinity of the perimeter 138 of the golf cart 24. For example, in some aspects, more than one light pipe 86 or pipe aperture 84 are disposed within the rocker panel 20, or a continuous light pipe is received by a continuous pipe aperture around a perimeter of the rocker panel 20.

Figure 12:
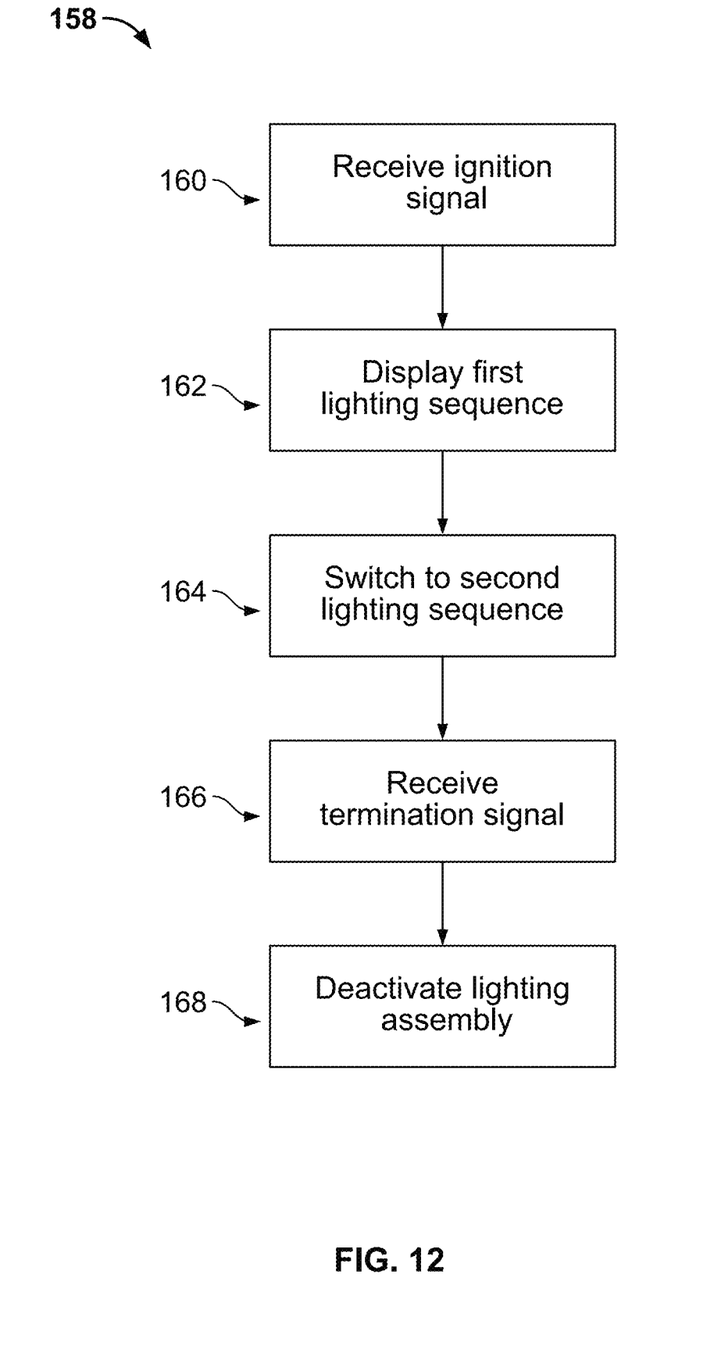
FIG. 12 is a flowchart that illustrates a method of using a lighting assembly according to some aspects of the present disclosure.

Referring now to FIG. 12, a flowchart is illustrated of a method 158 of using the lighting assembly 22. As previously discussed for FIG. 7, the light source 134 emits light using electric power drawn from the electrical system of the golf cart 24, and the lighting assembly 22 is connected to a controller, a processor, or a circuit board. In some aspects, the lighting assembly 22 is electrically connected directly to at least the ignition and drivetrain of the golf cart 24, or the lighting assembly 22 is indirectly connected to the ignition and drivetrain of the golf cart 24 through an intermediary processor. The processor provides lighting instructions to the lighting assembly 22. The ignition of the golf cart 24 is activated which further activates the drivetrain and effectively turns the golf cart 24 on, and an ignition signal is received by the processor at step 160. The processor, upon receiving the ignition signal, instructs a first lighting sequence of the lighting assembly 22 to be displayed at step 162. In some aspects, the first lighting sequence is a multicolor startup sequence which indicates that ignition of the golf cart 24 has occurred. In some aspects, the first lighting sequence is accompanied by sounds or tactile indications (e.g., vibrations on a steering wheel or seat) to ensure the operator is aware the ignition has been activated, or the first lighting sequence provides information about the status of the golf cart 24 (e.g., fuel or charge level, engine function, or another status indication).

Once the first lighting sequence has completed and the drivetrain is activated, meaning the golf cart 24 is capable of moving, the processor switches the lighting assembly 22 to display a second lighting sequence at step 164. In some aspects, the second lighting sequence is a solid white illumination that remains active until the golf cart 24 is turned off. Specifically, once the drivetrain is deactivated, a termination signal is received by the processor at step 166. The processor, upon reception of the termination signal, deactivates the lighting assembly 22 at step 168. The second lighting sequence remains activated while the golf cart 24 is on, regardless of whether the golf cart 24 is in an active state (i.e., if the golf cart 24 is moving) or if the golf cart 24 is in a stationary state. In this way, the lighting assembly 22 provides a visual cue that the drivetrain is turned on.

This provides a variety of benefits to an operator, such as, namely, enhanced safety features of the golf cart 24 which indicate that the golf cart 24 is in an active state. For example, the second lighting sequence provides a constant indication that informs a potential operator that the drivetrain is capable of being activated, thereby providing visual information on the state of the golf cart 24 at a distance therefrom. In some aspects, the second lighting sequence is visible a distance from the golf cart 24 that is between 0.00 m-499 m, 0.00 m-249 m, 0.00 m-99.0 m, 0.00 m-50.0 m, 0.00 m-25.0 m, or 0.00 m-10.0 m. If the second lighting sequence is activated, but an operator is not currently using the golf cart 24, the lighting assembly 22 provides a visual indication that the golf cart 24 has been left on and that the golf cart 24 is in an operable state. For example, if a golf cart 24 was inadvertently left on by an operator, the second lighting sequence would remain activated and indicate to the operator that cart had been improperly turned off. Similarly, the additional lighting provided on either side of the golf cart 24 by the lighting assembly 22 enhances visibility of the golf cart 24 from distances farther from the golf cart 24 than would be possible without the lighting assembly 22, and the additional lighting especially aids in visibility of the golf cart 24 at night or in dark conditions. Moreover, enhancing the visibility of the golf cart 24 provides an additional benefit of reducing the possibility of the golf cart 24 being lost or stolen, since the golf cart 24 can be seen from further away when the drivetrain is in an active state and the second light sequence is active. Thus, the safety features discussed herein related to the lighting assembly 22 and illumination of the rocker panel 20 are at least capable of increasing visibility of the golf cart 24, providing information to an operator indicating the operable status of the golf cart 24, and providing a unique and desirable aesthetic lighting appeal of the golf cart 24.

In addition to the safety features related to increased visibility and status of the golf cart 24, the lighting sequences provided by the lighting assembly 22 are also advantageous when determining if the golf cart 24 is suitable for storage or charging. As discussed above, the second lighting sequence indicates that the golf cart 24 is on, and the second lighting sequence further indicates that the golf cart 24 has been turned off when it is subsequentially deactivated. Deactivating the second lighting sequence signals to an operator that the golf cart 24 is capable of being stored without inadvertent movement of the golf cart 24. This reduces the risk of improper storage leading to damage of the golf cart 24 or other objects caused by improperly turning the golf cart 24 off. Moreover, deactivating the second lighting sequence advantageously reduces the risk of the golf cart 24 being left on and losing a charge during charging. This further reduces energy storage needed for the golf cart 24 since energy is only consumed by an active system (i.e., the charge of the golf cart 24 is not consumed when the second lighting sequence turns off since the cart is deactivated). In some aspects, the golf cart 24 only accepts charging when the second lighting sequence turns off, meaning the golf cart 24 can only be charged when it has been turned off.

In some aspects, the lighting assembly 22 is configured to display lighting sequences other than those described above. For example, in some aspects, a processor is connected to other aspects of the golf cart 24 (i.e., steering, headlights, brake lights, motor, battery, fuel tank, or other aspects) and instructs the lighting assembly 22 to display visual cues related to the other aspects of the golf cart 24. In some aspects, colors other than white are used for the second lighting sequence, or the processor allows an operator to customize a variety of different lighting sequences based on the operator's preference. In some aspects, the lighting assembly 22 includes sensors housed within/on the rocker panel 20 that are configured to detect hazards encountered by the golf cart 24 and instruct the lighting assembly 22 to display a hazard lighting sequence. It will be understood by those skilled in the art that different configurations of the rocker panel 20 and lighting assembly 22 capable of providing lighting indications to an operator exist other than those expressly stated.

The present invention has been described in terms of one or more preferred embodiments, and it should be appreciated that many equivalents, alternatives, variations, and modifications, aside from those expressly stated, are possible and within the scope of the invention.

We claim:

1. A golf cart, comprising:
   a rocker panel defining a first end, a second end opposite the first end, and a lateral axis that extends between the first end and the second end, the rocker panel comprising:
   a notch and a panel aperture disposed along the lateral axis, the panel aperture defining a first panel end that is located closer to the first end of the rocker panel and a second panel end that is located closer to the second end of the rocker panel;
   a pipe aperture that extends along the lateral axis, the pipe aperture comprising:
   a first aperture segment extending from the first end of the rocker panel to the notch,
   a second aperture segment extending from the notch to the first panel end of the panel aperture, and
   a third aperture segment extending from the second panel end of the panel aperture to the second end of the rocker panel;
   a panel secured within the panel aperture and including a logo applied thereto; and
   a light pipe secured within the pipe aperture, the light pipe comprising:
   a first pipe segment secured within the first aperture segment;
   a second pipe segment secured within the second aperture segment; and
   a third pipe segment secured within the third aperture segment,
   wherein a light source is disposed within the light pipe and the light pipe is configured to direct light emitted from the light source outward from the rocker panel of the golf cart.

2. The golf cart of claim 1, wherein a length of the first aperture segment measured along the lateral axis is greater than a length of the third aperture segment measured along the lateral axis.

3. The golf cart of claim 1, wherein the second aperture segment and the third aperture segment extend in line with a midplane of the panel aperture.

4. The golf cart of claim 1, wherein the light source is configured to display a multi-color lighting sequence.

5. The golf cart of claim 1, wherein the pipe aperture is spaced from a top edge of the rocker panel and a bottom edge of the rocker panel.

6. The golf cart of claim 5, wherein the panel aperture is spaced from the top edge of the rocker panel and the bottom edge of the rocker panel.

7. The golf cart of claim 1, wherein a length of the pipe aperture is between 0.5 m and 3.0 m.

8. The golf cart of claim 1, wherein the rocker panel extends between 25% and 100% of a length of the golf cart, expressed as a percentage.

9. A golf cart, comprising:
   a frame;
   a body disposed on the frame and including a side panel;
   a rocker panel coupled to the side panel and defining a first end, a second end opposite the first end, and a lateral axis that extends between the first end and the second end, the rocker panel comprising:
   a panel aperture disposed along the lateral axis and defining a first panel end that is located closer to the first end of the rocker panel and a second panel end that is located closer to the second end of the rocker panel; and
   a pipe aperture that extends along the lateral axis, the pipe aperture comprising:
   a first segment that is parallel with respect to the lateral axis and extends between the first end of the rocker panel and the first panel end of the panel aperture; and a second segment that is parallel with respect to the lateral axis and extends between the second panel end of the panel aperture and the second end of the rocker panel;

a light pipe secured within the pipe aperture of the rocker panel; and a light source housed within the light pipe, wherein the light source is configured to emit a multi-color lighting sequence when a switch on the golf cart is activated, and wherein the light pipe is configured to direct light emitted from the light source outward from the rocker panel of the golf cart.

10. The golf cart of claim 9, wherein the first segment and the second segment of the pipe aperture extend in line with a midplane of the panel aperture.

11. The golf cart of claim 9, wherein the light source is electrically coupled to a controller that is configured to provide lighting instructions to the light source.

12. The golf cart of claim 11, wherein the lighting instructions include at least the multi-color lighting sequence and a solid color sequence.

13. The golf cart of claim 11 further comprising a panel secured within the panel aperture and including a logo applied thereto.

14. A method of illuminating an exterior region of a golf cart, the method comprising:

receiving, by a processor, a first activation signal that a first switch of the golf cart has been activated;

instructing, by the processor, a light source housed within a light pipe to display a first lighting sequence, the light pipe secured within a pipe aperture defined by a rocker panel of the golf cart;

receiving, by the processor, a second activation signal that a second switch of the golf cart has been activated; and instructing, by the processor, the light source to switch from the first lighting sequence to a second lighting sequence.

15. The method of claim 14 further comprising:

receiving, by the processor, a termination signal that the first switch has been deactivated; and deactivating, by the processor, the light source.

16. The method of claim 14, wherein the first lighting sequence is a multi-color lighting sequence, and wherein the second lighting sequence is a solid color lighting sequence.

17. The method of claim 14 further comprising instructing, by a controller, the light source to display additional lighting sequences.

18. The method of claim 14, wherein the first switch is an ignition of the golf cart such that the processor instructs the light source to display the first lighting sequence when the ignition of the golf cart is activated.

19. The method of claim 14, wherein deactivating the second lighting sequence indicates that the golf cart has been turned off.

20. The method of claim 14 further comprising instructing, by the processor, the light source to display visual cues related to one or more features of the golf cart, wherein the one or more features of the golf cart includes at least one of steering, headlights, brake lights a motor, a battery, and a fuel tank of the golf cart.

21. The method of claim 14, wherein the light source is configured to provide visual information on a state of the golf cart, and wherein the visual information is visible at a distance from the golf cart that is between 0.0 meters and 250 meters.

* * * * *